United States Patent [19]
Schwarz

[11] 3,767,523
[45] Oct. 23, 1973

[54] SYNTHETIC PAPER BASE AND METHOD OF MANUFACTURE

[75] Inventor: Eckhard C. A. Schwarz, Neenah, Wis.

[73] Assignee: Kimberly-Clark Corporation, Neenah, Wis.

[22] Filed: Apr. 12, 1971

[21] Appl. No.: 133,132

[52] U.S. Cl............... 161/254, 161/252, 161/256, 161/164, 260/785 HC, 260/874, 260/901
[51] Int. Cl............................................. B32b 27/08
[58] Field of Search................... 161/252, 256, 247, 161/164

[56] References Cited
UNITED STATES PATENTS
3,592,725   7/1911   Yoshimura et al. ................. 161/162
3,589,976   6/1971   Erb .................................... 161/252
3,340,091   9/1967   Zweig ................................ 161/252

FOREIGN PATENTS OR APPLICATIONS
2,019,335   11/1970   Germany ............................ 161/247
954,873    4/1964    Great Britain ...................... 161/252

Primary Examiner—Alfred L. Leavitt
Assistant Examiner—C. B. Cosby
Attorney—Daniel J. Hanlon, Jr., William D. Herrick and Raymond J. Miller

[57] ABSTRACT

Improved synthetic paper base material manufactured by coextrusion of a layer of polymeric material having good physical properties with one or more layers of a different polymeric material having good printability. Adhesion between the layers is increased by including in each a minor amount of an ethylene-vinyl acetate copolymer.

5 Claims, 1 Drawing Figure

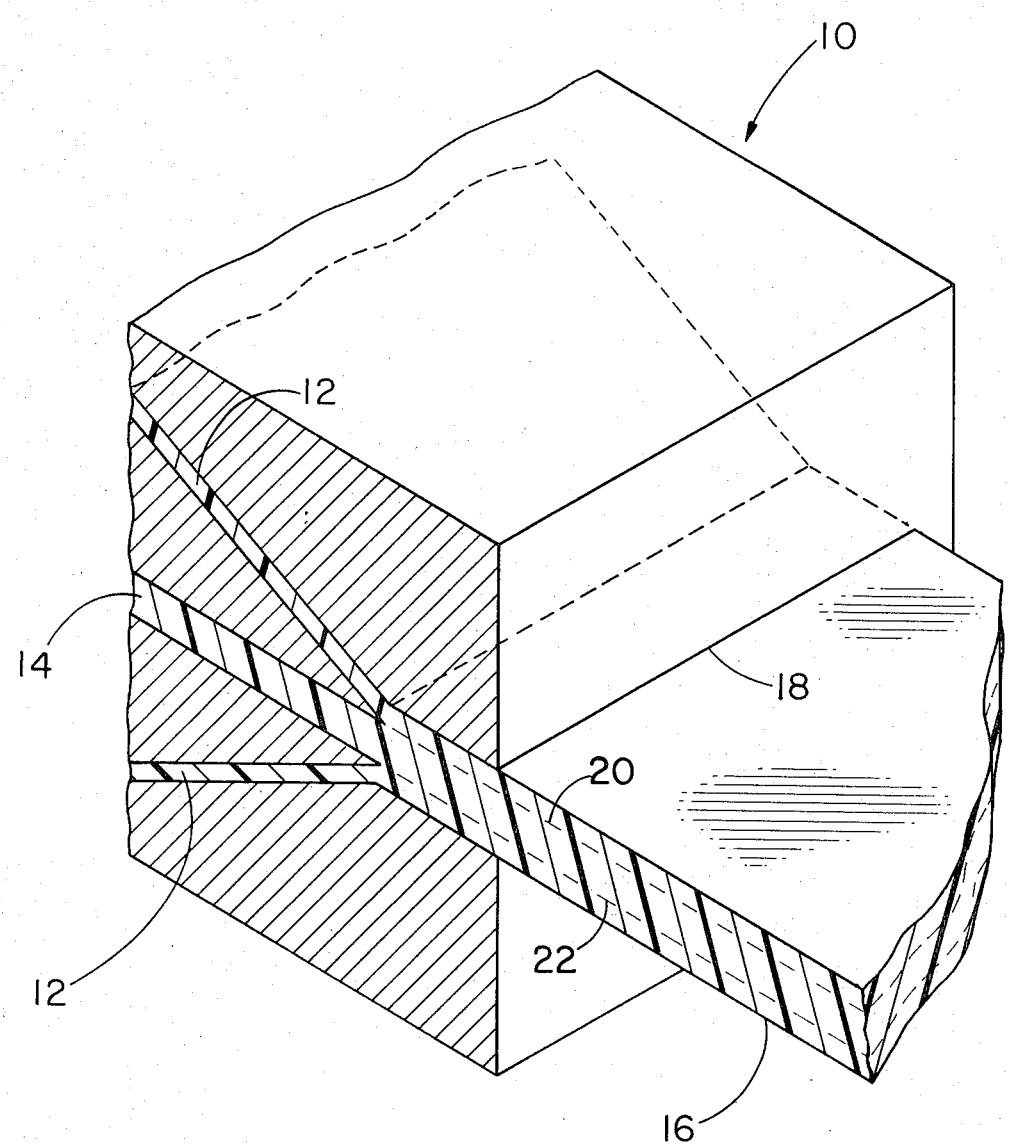

SYNTHETIC PAPER BASE AND METHOD OF MANUFACTURE

DESCRIPTION OF THE INVENTION

Paper has provided the basic substrate for written communications over a period of time extending back thousands of years. Although recent attempts have been made to produce materials to compete with paper for this market, such materials have met with limited success. The low cost of producing paper plus the responsiveness of the industry in adapting it to consumer needs have contributed largely to its success in dominating this market except for certain specialty items.

However, it is recognized that by virtue of our expanding population, alone, the demand for paper will ultimately exceed the capacity for its supply. This situation is presently approaching reality in a number of countries having a limited pulp supply. For example, in Japan vigorous efforts have been made to penetrate a market dependent upon imported paper materials as is demonstrated, for example, by U.S. Pat. No. 3,515,567.

Furthermore, in other highly developed areas such as the United States the plastics industries have succeeded in reducing the cost of some materials to a point where they could become competitive with paper. These plastics generally have additional advantages in that they can be designed for higher wet and tear strengths as well as increased resistance to degradation over the same properties of paper generally. Also, plastic sheets may be opacified to the extent that when produced at a very thin gauge they still may receive writing or printing on both sides. This latter property presents obvious advantages for applications such as air mail letters where sheet weight is a significant factor.

My invention relates generally to synthetic paper base materials and methods by which they may be manufactured.

More particularly my invention concerns synthetic paper base materials having a unique combination of desirable physical properties and printability as well as a method for producing such materials by a coextrusion process.

The use of film extrusion to manufacture synthetic papers is known. Typically, a synthetic polymer is extruded through a film die and then by subsequent processing, such as stretching and coating, converted into a paperlike material. Opacity may be obtained by addition of a filler material such as clay or titanium dioxide to the polymer prior to extrusion and/or by treating the film surface with a suitable solvent mixture which roughens or "crazes" the surface thus making it opaque and printable.

Heretofore, the search for a suitable polymer which can be formed into a paper substitute having good printability and desirable physical properties such as paperlike stiffness, high modulus, good tear resistance and dimensional stability to heat has met with only limited success.

It is a primary object of my invention to provide a synthetic paper base material possessing these desirable attributes.

Related to this primary objective it is a further object of my invention to provide a method whereby such a synthetic paper base material may be obtained.

Other objects and advantages of my invention will be apparent to those skilled in this art upon reference to the detailed disclosure and to the drawing in which, the sole FIGURE is a schematic cross-section of a film die which illustrates the formation of my improved base material for synthetic papers.

In accordance with my invention the synthetic paper base material is produced by a multilayer coextrusion process which allows control of both surface and bulk physical properties independently through the use of one polymer blend suitable to be converted into a printable surface on the outer layer and a different polymer blend suitable to give desirable bulk sheet properties as an inner layer. In this manner an improved balance of properties is obtained with inexpensive commodity polymers at a lower total cost than conventional processes utilizing a single layer film base composed of a single polymer blend.

I have found that the desirable results of my invention are obtained most economically when the outside layer comprises polystyrene or a styrene copolymer and the inside layer comprises polypropylene. The styrene polymer imparts printability and stiffness while the use of polypropylene results in improved tear resistance, heat stability, and high modulus.

Although the individual properties of these polymers are well known, ordinary laminating and coextrusion steps prior to my invention have not yielded a product suitable for use as a synthetic paper. While the styrene polymer and the polypropylene layers would merge in the molten phase during coextrusion, in the final product of conventional techniques they are easily separated and peeled apart. However, the combination of my invention possesses improved interlayer adhesion without adversely affecting other desirable functional properties of either layer.

I have found that addition of a minor amount of ethylene-vinyl acetate copolymer to both polymers has this desired effect. Thus, the extruder feeding the outer layer or layers is charged with a blend of polystyrene and ethylene-vinyl acetate copolymer and the extruder feeding the inner layer is charged with a blend of polypropylene and ethylene-vinyl acetate copolymer. Addition of pigment to either or both blends results in increased opacity. The blend ratios as well as the molar ratio and molecular weight of the ethylene-vinyl acetate copolymer are important parameters for optimum results as will be demonstrated by the specific examples.

Turning now to the drawing, the sole FIGURE is a schematic illustration of extruder die head apparatus 10 suitable for achieving my desired results. The polymer providing printability may be charged to either or both of the outside channels 12 while the other polymer is charged to the middle channel 14. Of course, when only two layers are being extruded, it makes no difference which two channels are used except that I prefer that the middle channel be larger than the other two so that when all three channels are used the weight of the two polymers is about equally divided in the extruded product 16. Dashed lines 20 and 22 symbolically represent boundaries between the layers although, as explained more fully below, the layers are adhesively bonded and do not readily separate. While this arrangement is preferred, the usefulness of my invention is not limited thereto and, in fact, the relative thicknesses and weights may be varied within the range where the middle layer constitutes from 20 to 90 percent by weight of the total, for example, depending upon the particular properties desired in the final product. As shown, it is also preferred that the the polymer streams from each of the channels 12 and 14 meet inside die 10 under laminar flow conditions at a point within the range of from about ⅛ to 3 inches before die lip 18. This provides for good interlayer adhesion. However, other arrangements will suggest themselves to those skilled in this art and may be utilized as well without departing from the spirit and scope of my invention.

EXAMPLE I

A 24 inch flat film coextrusion die designed to produce a two-layered film was connected to two 2½ inch extruders (Johnston Spartan Extruder, Johnson Manufacturing Co., Chippewa Falls, Wis.). The die was designed so that the polymer streams from each extruder meet inside the die under laminar flow conditions one-half inch before the die lip.

One extruder was charged with polystyrene ("Styron 685" melt index-2.4 as determined in accordance with ASTM D1238-62T) and the other with polypropylene ("Profax 6423, melt index 8.0 as determined in accordance with ASTM 1238-D). At 25 RPM of the extruder screw, the resulting output was 35 lbs. per hour for each layer at the following temperature conditions:

TABLE I

| | Zone 1 | Zone 2 | Zone 3 | Zone 4 | Die |
|---|---|---|---|---|---|
| Polystyrene (°F) | 350 | 375 | 400 | 425 | 425 |
| Polypropylene (°F) | 375 | 425 | 425 | 425 | 425 |

Zone 1 includes the extruder feed section, Zone 2 the extruder compression section, Zone 3 the extruder metering section, and Zone 4 the die adapter.

The product was cast on a chill roll maintained at about 70°F rotating at 13 feet per minute and transferred to a winder. The layers had no adhesion and could be easily peeled apart.

EXAMPLE II

Example I was repeated substituting for the polypropylene the following blends of polypropylene and ethylene-vinyl acetate (EVA) (Elvax 360 by DuPont) copolymer. Only a small improvement in adhesion was obtained even at high concentrations of the ethylene-vinyl acetate copolymer as shown in Table II.

TABLE II

| Run | Polypropylene/EVA copolymer (Pts by weight) | Peel Adhesion lb./inch |
|---|---|---|
| A | 10/1 | 0.1 |
| B | 10/2 | 0.2 |
| C | 10/4 | 0.3 |
| D | 10/6 | 0.4 |

EXAMPLE III

This example demonstrates that high loads of the ethylene-vinyl acetate copolymer blended with polypropylene have a detrimental effect on the heat shrinkage stability of the blend. The films of Example II were delaminated and the polypropylene/ethylene-vinyl acetate copolymer blend components were tested for heat shrinkage as follows: film strips (¼ inch by 5 inches, with the longer dimension in the machine direction or orthogonal to the die lip) were drawn to four times their original length, annealed at 120°C. for 5 minutes at constant length, and then free shrinkage was determined after exposure to 130°C. for 10 minutes. The laminates for Runs A, B, and C were also tested in a similar manner.

% Shrinkage = [(initial length-length after shrinkage)/initial length] × 100

The results are listed in Table III.

TABLE III

| Sample | % Shrinkage |
|---|---|
| Pure polypropylene (Example I) | 2.0 |
| Run A (Example II) | 2.0 |
| Run B (Example II) | 2.4 |
| Run C (Example II) | 10.0 |
| Run D (Example II) | 12.0 |
| Run A Laminate (Example II) | 1.8 |
| Run B Laminate (Example II) | 2.2 |
| Run C Laminate (Example II) | 8.7 |

Compositions of a much higher ethylene-vinyl acetate copolymer content than Run B are likely to be unstable towards heat and unsuitable as a synthetic paper substrate.

EXAMPLE IV

This example illustrates the effect of varying the ethylene-vinyl acetate loads in the blend with polystyrene on the heat shrinkage properties of the laminate. Films from blends of varying proportions of polystyrene/ethylene-vinyl acetate copolymer were prepared and laminates formed as in Example II. The polystyrene-containing layers were stripped and tested for shrinkage after elongation both before and after annealing. The tests were performed as in the previous example.

TABLE IV

| Composition Styron 686/EVA 360 Weight Ratio | Annealed | % Shrinkage |
|---|---|---|
| Pure polystyrene (Example I) | Yes | 1.5 |
| Pure polystyrene (Example I) | No | 37.5 |
| Run E (10/1) | Yes | 1.8 |
| Run F (10/1) | No | 39.4 |
| Run G (10/2) | Yes | 2.8 |
| Run H (10/2) | No | 39.2 |
| Run I (10/4) | Yes | 1.4 |
| Run J (10/4) | No | 40.2 |

From the above it can be seen that the amount of ethylene-vinyl acetate copolymer in the polystyrene blend layer has a very minor effect on shrinkage properties within the range of 1 to 4 parts per 10 parts of polystyrene. Also, annealing at 130°C. effectively reduces the shrinkage of both polystyrene and its blends with ethylene-vinyl acetate copolymer.

While the variation in shrinkage properties between the polystyrene-containing and the polypropylene-containing layers has a tendency to produce curling, this tendency is eliminated in the preferred balance three layer laminate since the two outside layers tend to curl in opposite directions.

EXAMPLE V

Example II was repeated using various blends of ethylene-vinyl acetate copolymer with the polystyrene component as well as with the polypropylene component. Peel adhesion results shown in Table V were determined as in Example II.

TABLE V

| Polystyrene | Polypropylene | Peel Adhesion |

| Run | EVA Copolymer | EVA Copolymer | lb./inch |
|---|---|---|---|
| K | 10/1 | 10/1 | 0.4 |
| L | 10/1 | 10/2 | 1.8 |
| M | 10/2 | 10/1 | 3.1 |
| N | 10/2 | 10/2 | 4.5 |
| O | 10/4 | 10/1 | 3.4 |
| P | 10/4 | 10/2 | 6.0 |
| Q | 10/4 | 10/0 | 0.9 |

It is clear that the addition of ethylene-vinyl acetate copolymer to both components substantially improves their adhesion when compared to its addition to one layer only, e.g. Run Q and Example II. Peel adhesion about equal to or greater than that which was obtained in Run M is considered sufficient for the product to be further processed into a synthetic paper.

EXAMPLE VI

This example demonstrates the effect of molecular weight of the ethylene-vinyl acetate copolymer on interlayer adhesion.

A coextrusion run was performed using the blend ratios of Run M (Example V) except that ELVAX-360 (25 percent vinyl acetate, corresponding to a mole ratio of ethylene to vinyl acetate of 9:1) was replaced by ethylene-vinyl acetate copolymer grades of identical acetate content but lower viscosities. The results appear in TABLE VI. Melt indices were determined in accordance with ASTM-D1238.

TABLE VI

| EVA Grade | Melt Index | Peel Adhesion lb./inch |
|---|---|---|
| Elvax 360 (Run G, Example IV) | 2.0 | 3.1 |
| Elvax 350 | 19.0 | 2.9 |
| Elvax 310 | 390 | 0.8 |

Peel adhesion is essentially unvaried between melt indices of from about 2 to about 19, so the ethylene-vinyl acetate copolymer is preferably selected from within this range to produce the desired rheology for the blend.

EXAMPLE VII

This example illustrates the effect of vinyl acetate content variation in the ethylene-vinyl acetate copolymer on adhesion and modulus of the polypropylene layer.

Ethylene-vinyl acetate copolymer blends with polypropylene and with polystyrene were coextruded in ratios as in Run M, Example V. A number of ethylene-vinyl acetate copolymer grades of varying vinyl acetate content were used and peel adhesion measured. Initial modulus was measured on an Instron tester in the machine direction using a 1 inch wide film sample and a 5 inch jaw span with a rate of strain of 1 inch/minute. Table VII gives the results of these tests. Percents are by weight based on the weight of copolymer.

TABLE VII

| Run | EVA Melt Index (ASTM D-1238) | % Acetate of EVA | Adhesion (lb./in.) | Modulus (psi) |
|---|---|---|---|---|
| R(Elvax 40) | 45 | 40 | 3.8 | 28,700 |
| S(Elvax 150) | 28 | 33 | 3.5 | 35,300 |
| T(Elvax 240) | 28 | 28 | 3.1 | 61,500 |
| U(Elvax 350) | 22 | 25 | 2.9 | 65,500 |
| V(Elvax 460) | 29 | 18 | 1.8 | 71,500 |
| W(Lupolen-V3510K) | 4 | 13 | 1.4 | 71,400 |

Although the adhesion is increased at higher acetate contents, the decrease in modulus indicates plasticization which makes blends having an acetate content above about 33 percent unsuitable for use as a synthetic paper base.

Having disclosed my invention in terms of preferred embodiments, it will be apparent to those skilled in this art that it may be variously employed within the spirit and scope of the claims which follow.

I claim:

1. A composite for the manufacture of paper substitutes having good printability and paper-like physical properties, comprising:
   a layer comprising a blend consisting essentially of polypropylene and from 1 to 2 parts per 10 parts of polypropylene of a copolymer of ethylene and vinyl acetate having an acetate content below about 33 percent; and
   a surface layer comprising a blend consisting essentially of polystyrene and from 1 to 4 parts per 10 parts of polystyrene of a copolymer of ethylene and vinyl acetate;
   wherein said copolymers of ethylene and vinyl acetate have a melt index in the range of from 2 to 19;
   wherein said layer comprising the polypropylene blend comprises 20 to 90 percent of the total composite weight; and
   wherein said composite has interlayer peel adhesion of at least about 3.1 lbs./inch and is formed by coextrusion so that the layers meet within a die under laminar flow conditions.

2. The composite of claim 1 wherein at least one of said layers contains an opacifying pigment.

3. The composite of claim 1 wherein the weight of polypropylene in the composite is about equal to the weight of polystyrene.

4. The composite of claim 1 wherein the combination comprises a central layer of the blend including polypropylene and two surface layers of the blend including polystyrene.

5. The composite of claim 4 wherein each of said surface layers is one-half the thickness of said central layer.

* * * * *